April 11, 1939. G. E. BARNHART 2,154,392
METHOD OF MAKING TAPERED TUBES
Filed Dec. 6, 1937 3 Sheets-Sheet 1
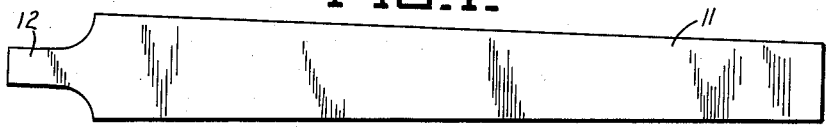
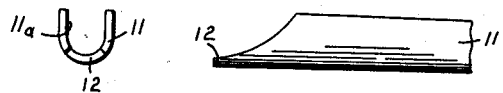
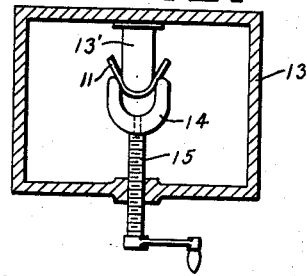
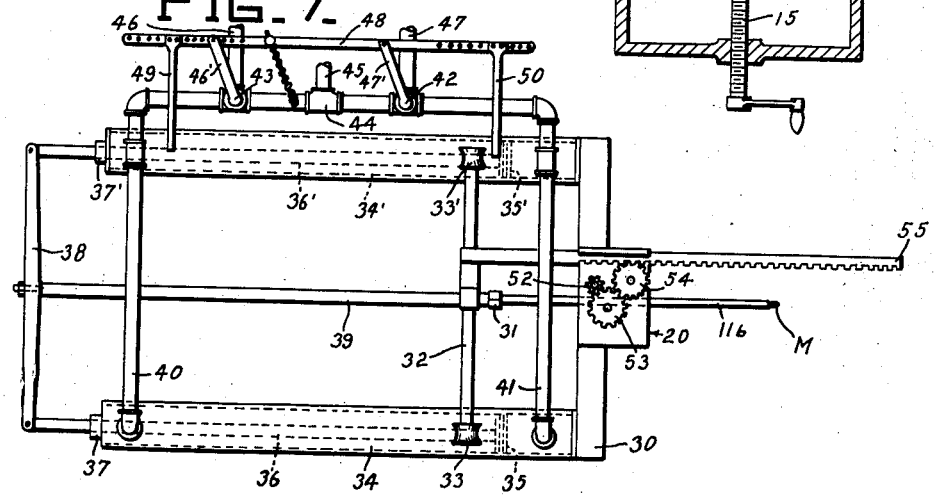
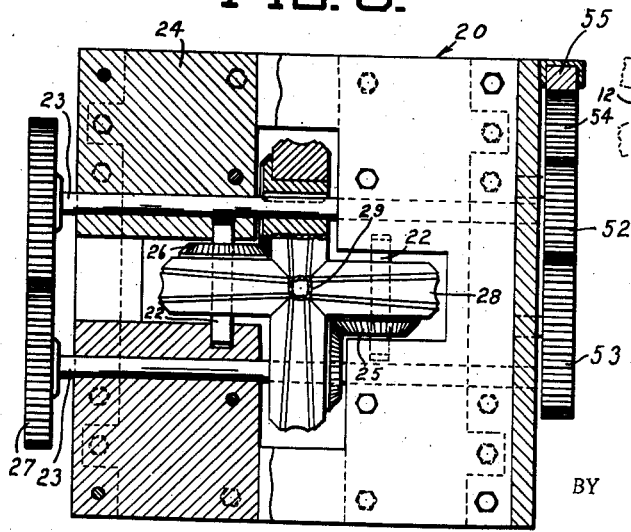
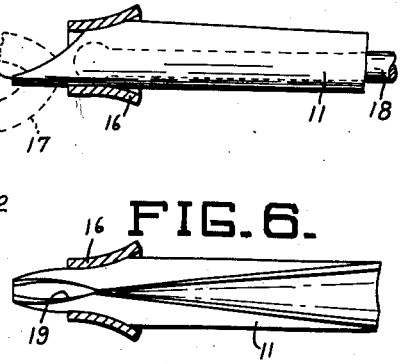
INVENTOR.
G. E. BARNHART
BY
ATTORNEY.

April 11, 1939.  G. E. BARNHART  2,154,392
METHOD OF MAKING TAPERED TUBES
Filed Dec. 6, 1937  3 Sheets-Sheet 2
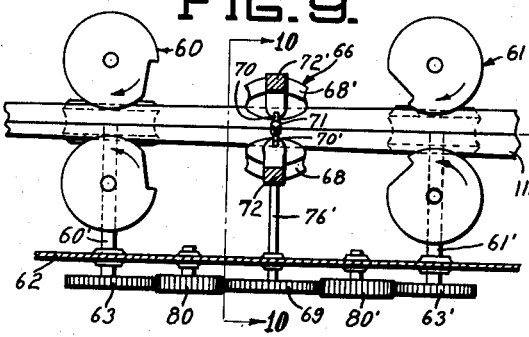

April 11, 1939. G. E. BARNHART 2,154,392
METHOD OF MAKING TAPERED TUBES
Filed Dec. 6, 1937 3 Sheets—Sheet 3
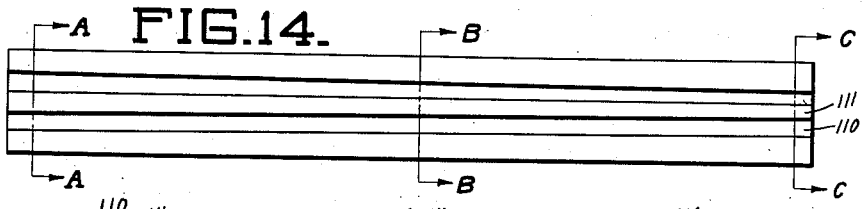
  
FIG.14A. FIG.14B. FIG.14C.
  
FIG.15A. FIG.15B. FIG.15C.
FIG.16A. FIG.16B. FIG.16C.
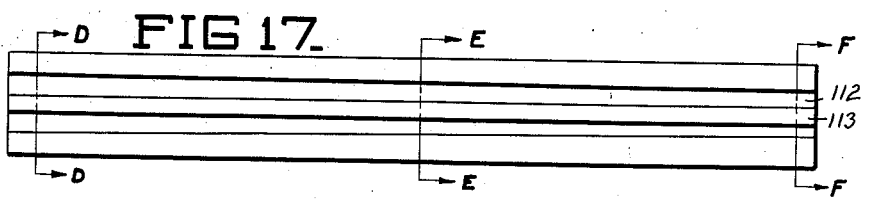
  
FIG.17D. FIG.17E. FIG.17F.
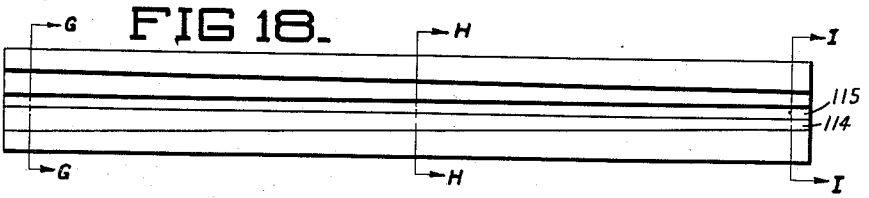
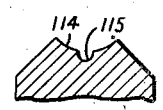  
FIG.18G. FIG.18H. FIG.18I.
INVENTOR.
G. E. BARNHART
BY
ATTORNEY.

Patented Apr. 11, 1939

2,154,392

UNITED STATES PATENT OFFICE 2,154,392

METHOD OF MAKING TAPERED TUBES

George E. Barnhart, Pasadena, Calif.

Application December 6, 1937, Serial No. 178,417

7 Claims. (Cl. 205—8)

This invention has to do in a general way with the art of working metal, and is more particularly related to the production of channeled, tapered tubes or structural elements which may vary in size from tubes for columns, lamp posts, etc. to golf shafts, fishing rods, and the like.

It is one object of this invention to provide a novel method for producing tapered tubes of the so called welded or seamed type wherein a flat plate is bent to circular or other cross section and its edges are brazed or welded.

It is another object of this invention to provide a method and apparatus for forming tapered tubes which have drawn ribs or channels in their walls and wherein the metal between the ribs or channels is undrawn.

It is a still further object of this invention to provide a method and apparatus for producing a ribbed or channelled tapered tube in which the radius of the rib or channel varies progressively throughout the length of the tube whereby hand-carved columns, etc., may be duplicated so that they are architecturally correct.

It is still another object of this invention to provide a method and apparatus for forming ribbed, channelled or smooth tapered tubes which have sections therein of opposite taper. More specifically, this invention has for an object the production of a tube which is larger at a point intermediate its ends than it is at either end.

The general procedure followed in the production of seamed or welded tapered tubes in accordance with my invention, comprises the steps of first cutting a tapered blank or pattern from a sheet metal plate, then bending the pattern so that it is substantially U-shaped in cross section. The U-shaped member thus formed is then drawn through a fixed circular die opening which rounds it out into cylindrical form. The member is of course open along one side having an elongated V-shaped opening therein by virtue of its original tapered shape. A mandrel or stationery plug may or may not be used in the drawing operation just referred to. The cylindrical member is now drawn through a contractable die opening which is contracted in accurately timed relation with the movement of the tube therethrough, the rate of contraction also bearing a definite relation to the original taper of the pattern so that the opening in the cylindrical member is closed to form a tapered tube having an open seam therein. A mandrel may or may not be used in this operation. The tapered tube formed in this matter is then drawn through a series of pressure die openings to force the edges of the seam into pressure engagement with each other and the seam is welded in any suitable manner during such pressure application.

It is one feature of this invention that the pressure is applied to the seam before, during, and after the welding operation. After the welding operation, the tube may be ground or treated in any suitable manner to remove any excess metal at the seam such as drawing the tube after welding to correct and smooth the weld, and the tube is preferably then subjected to further working by passing the same through dies to correct for any welding irregularities or this means may be used to straighten the tube.

I consider it preferable in the practice of the invention to first produce a tapered tube having the fibers of the metal uniform therein and then to employ dies which subject the metal of the tube to a drawing action to provide a rib or channel with the drawing action confined to the rib or channel thus leaving the fibers between the rib or channel uniform throughout the circumference of the unribbed or unchanneled portion of the tube and parallel to the neutral axis of the tube, the tube being of any desired cross section.

It is a still further object of this invention to produce a die mechanism which is of novel construction and is adapted for use in forming ribs or channels in the tube wall without effecting the character of the material between the ribs or channels.

The details in the construction of certain preferred forms of apparatus contemplated by this invention, together with further details in the preferred procedure followed in the method contemplated by this invention, as well as further objects of the invention, will be best understood from the following description of the accompanying drawings which are chosen for illustrative purposes only, and in which:

Fig. 1 shows a sheet-metal blank which is employed in the first process contemplated by this invention;

Fig. 2 is a sectional elevation illustrating the second process in the method for producing a seamed or welded tube;

Fig. 3 is an elevational view showing the shape of the metal blank after it has been bent in the second process;

Fig. 4 is an end view of the blank shown in Fig. 3;

Fig. 5 is an elevational view partly in section illustrating the third step in the process of forming a seamed or welded metal tube;

Fig. 6 is a plan view partly in section further illustrating the step shown in Fig. 5;

Fig. 7 is a plan view of one form of tube drawing mechanism contemplated by this invention;

Fig. 8 is an elevational view with parts in section showing a preferred form of die mechanism contemplated by this invention;

Fig. 9 is a plan view illustrating one preferred form of welding apparatus contemplated by this invention;

Fig. 10 is a sectional elevation taken on the line 10—10 of Fig. 9;

Fig. 11 is an elevational view partly in section illustrating one step in the process whereby a double taper tube is formed;

Fig. 12 is an elevational view with parts in section illustrating a modification of the step illustrated in Fig. 11;

Fig. 13 is an enlarged end view illustrating a modified form of die mechanism;

Fig. 14 is a diagrammatic view showing the development of the periphery of a die element contemplated by this invention;

Figs. 14A, 14B, and 14C, inclusive, are sectional elevations taken on the lines AA, BB, and CC on Fig. 14 illustrating one form of bead or ridge which may be employed in the die groove shown in Fig. 14;

Figs. 15A, 15B, and 15C are sectional views on the line AA, BB, and CC of Fig. 14 illustrating another form of bead which may be employed in the die groove;

Figs. 16A, 16B, and 16C are sectional views on the lines A to B of Fig. 14 showing another modified form of bead construction;

Fig. 17 is a development similar to Fig. 14 illustrating a further modified form of bead which may be employed in the die groove contemplated by this invention;

Figs. 17D, 17E, and 17F are sectional views taken on the lines DD, EE, and FF of Feb. 17;

Fig. 18 is a development of another die periphery, showing the same as being provided with one form of recess which is employed in forming a rib on a tube drawn through a die opening including a die of this character; and Figs. 18G, 18H, and 18I are sectional views on the lines GG, HH, and II in Fig. 18.

This application is a continuation in part of my copending application, Serial No. 693,859 filed October 16, 1933.

More particularly describing the invention as herein illustrated, reference numeral 11 indicates a tapered blank of sheet metal which is shown as having a reduced tip portion 12 which is subsequently used as a means for gripping the blank with a come-along.

As pointed out above, the first step in the process of forming this welded tube, consists in bending the blank 11 to a U-shaped cross section as illustrated at 11a in Figs. 3 and 4. This is accomplished by any suitable means, as the bending mechanism shown in Fig. 2 which embodies a frame 13 having a fixed forming bar 13' about which the plate 11 is forced into pressure engagement by means such as the U-shaped shoe 14 which is mounted on the upper end of a screw 15. After the blank has been bent to the U-shape as above described, it is preferably drawn through a fixed circular die opening in the tapered die element 16 of Figs. 5 and 6.

Reference numeral 17 indicates a suitable grip or come-along which is shown in broken lines, and it will be understood that when the blank is drawn through the die 16 (the use of a mandrel 18 being optional) it assumes a cylindrical shape with an elongated V-shaped opening along one side as indicated at 19.

The cylindrical member thus formed is then drawn through a die mechanism of the general character indicates by reference to numeral 20. This die mechanism comprises a plurality of rotatable die elements, preferably four, which are keyed to spindles 22 and shafts 23 in a block or head 24. These die elements are geared together by means of gears 25, 26, and 27 so as to be rotated in synchronism, and they are provided with peripheral grooves 28 which are similar in shape and are of similar taper, the dies being arranged so as to be tangent with each other in a common plane, thereby forming a die opening 29 at their region of tangency.

As pointed out above, it is preferable in the operation of a device of this character to draw the tube through such a die opening, and this action is obtained by starting the tube with its largest diameter in pressure engagement with the largest diameter die opening formed by the dies, the latter having been rotated to the point at which the greatest width in the grooves 28 are tangent and then rotating the dies in timed relation with the movement of the tube therethrough and in a direction opposite to such movement.

The movement of the tube through the die opening and the rotation of the die is effected by a mechanism of the general character illustrated in Fig. 7 where the die mechanism 20 is shown as being mounted upon a suitable support 30 with its opening in front of a come-along 31 which is carried by a cross beam 32, such cross beam in turn being supported by rollers 33 and 33' which rest on cylinders 34 and 34'. The cylinders 34 and 34' contain pistons 35 and 35' mounted on plunger rods 36 and 36' that extend through packing glands 37 and 37' and are secured to a cross head 38. The cross head 38 is attached to a tension bar 39 which in turn is secured to the beam member 32.

Pressure fluid is admitted to the opposite ends of the cylinders through conduits 40 and 41, such conduits being connected through three-way valves 42 and 43 with a T-connection 44 which in turn is provided with a delivery connection 45 leading to a suitable source of pressure fluid, not shown.

Reference numerals 46 and 47 indicate exhaust connections which communicate with the three-way valves. The valves are operated so as to admit pressure fluid to one end of one set of cylinders and exhaust fluid from the other end of the other set of cylinders by means of levers 46' and 47' which are pivotally attached to a bar 48, such bar being provided with fingers 49 and 50 which are shown as being adjustably mounted thereon and are positioned so as to be engaged by a portion of the traveling beam 32 at opposite ends of its stroke whereby the reversal of motion in the come-along operated mechanism is automatically effected.

It is important that the dies be positively operated in accurately timed relation with the movement of the tube therethrough, and for this purpose I provide a pinion 52 on the upper end of one of the shafts 23, such pinion engaging an idle gear 53 which in turn is in mesh with a gear 54, the latter gear being operated by a rack 55 which is secured to the cross beam member 32.

The next step in the process contemplated by this invention is then to take the cylindrical tube formed in the step illustrated in Figs. 5 and 6, and draw it through the die opening 29 by the mechanism shown in Fig. 7. If desired, several passes may be made so as to draw the fibers out uniformly to the desired extent and to produce a smooth tapered tube with the edges of the seam in perfect engagement. This drawing may also be used to change the wall thickness of the tube.

In Figs. 9 and 10, I show one form of mechanism which may be employed in welding the seam. As was pointed out above, I consider it preferable in forming the weld to apply pressure to the seam prior to, during, and subsequent to the actual application of the weld. The welding device as shown in Figs. 9 and 10 comprises die mechanisms 60 and 61 which are similar to the die mechanism 20 in Fig. 8, and are provided with driving shafts 60' and 61' extending through a supporting plate 62 having gears 63 and 63' on their ends.

Assuming the tube 11b to be drawn through the die in the general direction of the arrow (Fig. 9) by any suitable mechanism such as the apparatus shown in Fig. 7, it will be understood that the tube first passes through the die mechanism 60 and then passes through the die mechanism 61, such die mechanisms being rotated in a direction opposite to the direction of movement of the tube as indicated by the arrow Y.

I consider it preferable to weld the seam in the tube at some point intermediate these two dies, and, as pointed out above, it is a feature of the invention that the seam is subjected to pressure during the weld as well as before and after the weld is effected.

The means for welding the seam in this form of my invention is indicated generally by reference numeral 66 and comprises a bottom roller 67 which has a tapered groove in its periphery conforming to the taper of the tube, and a pair of top rollers 68 and 68' positioned on opposite sides of the seam, such rollers also having tapered grooves in their peripheries which correspond to the taper of the tube. The bottom roller 67 is mounted on a shaft 67' which extends through a supporting plate 62 and has a gear 69 on its outer end.

The rollers 68 and 68' are keyed to spindles 70 and 70' which are connected together through a universal joint 71 and are supported in the bifurcated ends of angularly disposed supporting bars 72 and 72' which in turn are supported by a horizontal supporting plate 73.

Reference numeral 74 indicates insulation which is interposed between the bars 72 and 72' and the plate 73. The bars 72 and 72' are connected through conductors 75 and 75' with a suitable source of electrical energy so that the rollers 68 and 68' can be used to deliver electrical current to the tube on opposite sides of the seam, thereby effecting an electric weld in the seam.

Reference numeral 76 indicates a shaft which is connected through a universal joint 77 with the spindle 70' whereby the two welding rollers are rotated, and the shaft 76 is provided with a gear 78 connected through an idle gear 79 with the gear 69 so that the rotation of the rollers in this set is in synchronism.

In order that the rollers in the welding set may operate in synchronism with the die rollers 60 and 61, the gears 63, 69, and 63' are all interconnected through idle pinions 80 and 80', and these gears are actuated from a suitable rack generally indicated at 81 which may be operated in the manner similar to the rack shown in Fig. 7.

It was pointed out as one object of this invention, to form a tube having two tapered portions of opposite taper. The procedure followed in the formation of such a tube, which may be a tube similar to the type described above or may be a seamless tube, is to first taper the tube in one direction in a mechanism such as is shown in Figs. 7 and 8 and then turn the tube around and draw part of it in the opposite direction through the same or another tapered die mechanism, rotating the die in the direction opposite to the direction of movement of the tube. This last mentioned step in the operation is illustrated in Fig. 11 where the tube 85 is shown as being drawn in the direction of the arrow R through a plurality of tangent dies indicated generally by reference numeral 86, such dies being rotated in the direction of the arrows S.

The broken line 85' indicates the configuration which is imparted to that portion of the tube drawn through the dies in this manner. It will be understood that the position shown is that which the tube occupies just prior to the initiation of the drawing action. Similar results may be obtained by drawing the tube in the same direction as was used in forming the first taper through a die mechanism which is rotated in the same direction as the tube is moving. Such a procedure is illustrated in Fig. 12 where the tube 85a, drawn in the direction of the arrow E', passes through a die mechanism which is operated in the direction of the arrows S'.

In forming a tube of a single taper, it will be understood that a mandrel may or may not be employed. In Fig. 7 a mandrel is indicated by reference letter M.

It was pointed out above as another object of this invention to provide a novel die mechanism which may be employed in the production of a tapered tube having channels or ribs in its wall. These channels or ribs may be distributed uniformly throughout the periphery of the wall of the tube or a smaller number of channels or ribs may be placed in the tube at various points for varying the distribution of the strength and obtaining consequent variations in the action of the tube when it is subjected to various stresses.

It is a novel feature of this invention that the channels or ribs are drawn into the tube wall by means of a novel form of die mechanism so that the portion of the tube between the channels or ribs is undrawn and its fibers are left uniform. One form of such a die mechanism is illustrated in Fig. 13 where the die is shown as comprising four rotatable die elements 98 and 99, 100, and 101 which are arranged in tangential relation to each other about a die area 102, all of the dies, of course, having tapered grooves 98' in their peripheries. The die element 98 is shown as being provided with a ridge 103 in its groove 98' which forms a channel 104 in the tube, and the die element 99 is shown as having a recess 105 in its groove 98' which forms a rib 106 in the wall of the tube. It will be understood that dies having ridges and recesses in their peripheral grooves may be employed in various combinations or individually to obtain any desired cross-sectional configuration in the finished tube.

In Figs. 14 to 18I, I show various modifications which may be employed in the configuration of the peripheral grooves or rotatable dies of the class hereinabove referred to. Fig. 14 is a development of the periphery of a die of the general character described above which is formed with a tapered groove 110. The groove 110 has a ridge 111 therein, and in this form, the ridge is shown as decreasing in width as the width of the groove 110 decreases. The ridge 111, in addition to decreasing in width as pointed out above, may be of uniform depth throughout its entire length, such form being illustrated in Figs. 14A and 14C. The ridge (111') may increase in depth as the width of the groove 110 decreases as illustrated in Figs. 15A to 15C, or it may decrease in depth as the width of the groove 110 decreases as indicated at 111'' in Figs. 16A to 16C.

From the drawings it will be noted in Figs. 14A-14C, 15A-15C, and 16A-16C that although the chordal width of the die groove in these figures decreases and the width of the die ridge decreases, that the distance (indicated at A in Figs. 14A, 14B and 14C) from the edges of the ridge to the outer edge of the die groove remains the same. As a result the total circumferential length of contact between the die and the tube being drawn, outside of the groove being drawn in the tube, remains unchanged. Since the radius of curvature of the contact line between the die and work decreases, the diameter of the tube decreases in passing through the die. The cross sectional area of the channel forming ridge in the die varies as the diameter of the die groove varies.

As a result of the above the drawing action is confined to that portion of the tube which is engaged by the ridge in the die, so that the remainder of the tube is undrawn and the fiber arrangement therein remains undisturbed.

Fig. 17 illustrates a development of a die periphery in which the tapered groove 112 has a ridge 113 which is of uniform width throughout its length and in the sections shown in 17D to 17F the ridge 113 is shown as being of uniform depth. It will be understood, however, that the ridge may vary in depth as illustrated in Figs. 15A to 15C or 16A to 16C respectively.

Fig. 18 shows a development of a die periphery in which the groove 114 therein is provided with a recess 115 which is shown as increasing in width as the width of the groove 114 decreases. This recess 115 as shown in the sections 18E to 18I is of uniform depth throughout its length. It will be understood, however, that the depth of the recess may either decrease or increase as the width of the groove 114 decreases.

It is also to be understood that I may employ a ridge of this same type to provide channels in the tube which increase in width as the cross-sectional area of the tube decreases.

Relative to the rotatable die unit, it should be pointed out that drawing action will be obtained either by rotating the dies in a direction opposite to the movement of the word therethrough or by rotating the dies in the same direction as the work travels and at a velocity such that the speed of travel of the die surface is substantially less than that of the work. In this latter case, of course, the circumference of the die surface is substantially less than the length of the work.

It is to be understood that, while I have herein described and illustrated certain perferred forms of apparatus and certain preferred procedures contemplated by this invention, the apparatus and procedure may be varied without departing from the scope of my invention as defined in the appended claims.

Having thus described my invention I claim:

1. The method of forming a tapered tube having a periphery which is defined by arcuate portions with a channel between the arcuate portions which includes advancing a tapered unchannelled tube through a contractable die opening having a tube deforming portion, and contracting said die opening in accordance as the tube passes therethrough, said tube deforming portion being of a size and shape to produce a deformation in the tube by drawing action with the drawing action confined to that portion of the tube which is being deformed.

2. The method of forming a tapered tube having a periphery which is defined by arcuate portions with a channel between the arcuate portions which includes advancing a tapered unchannelled tube through a rotary contractable die opening having a groove therein, the die within the groove having a ridge projecting into the groove, and contracting said die opening as the tube moves therethrough, said ridge being of a size and shape to produce a channel in the tube by drawing action, the total circumferential length of contact between the die and the work remaining unchanged with the radius of curvature of the contact between the die and work decreasing as the diameter of the tube decreases in passing through the die.

3. The method of forming a tapered tube having a periphery which is defined by arcuate portions with a channel between the arcuate portions which includes advancing a tapered unchannelled tube through a rotary contractable die opening having a groove therein, the die within the groove having a ridge projecting into the groove, and contracting said die opening as the tube moves therethrough, said ridge being of a size and shape to produce a channel in the tube by drawing action, the total circumferential length of contact between the die and the work remaining unchanged and with the radius of curvature of the contact line between the die and work decreasing as the diameter of the tube decreases in passing through the die and with the area of the groove forming ridge in the die varying as the diameter of the die varies so that the drawing action is confined to that portion of the tube which is being channelled.

4. The method of forming a tapered tube having a periphery which is defined by arcuate portions with a channel between the arcuate portions which includes advancing a tapered unchannelled tube through a rotary contractable die opening having a groove therein, the die within the groove having a ridge projecting into the groove, and contracting said die opening as the tube moves therethrough, said ridge being of a size and shape to produce a channel in the tube by drawing action, the total circumferential length of contact between the die and the work remaining unchanged and with the radius of curvature of the contact line between the die and work decreasing as the diameter of the tube decreases in passing through the die and with the area of the groove forming ridge in the die being increased proportionately as the diameter of the die decreases so that the drawing action is confined to that portion of the tube which is being channelled.

5. The method of forming a tapered tube having a periphery which is defined by arcuate portions with a channel between the arcuate portions which includes advancing a tapered unchannelled tube through a rotary contractable member comprising a plurality of parts and with the parts including a die opening having a groove therein, the die within the groove having a ridge projecting into the groove, and contracting said die opening as the tube moves therethrough, said ridge being of a size and shape to produce a channel in the tube by drawing action, the total circumferential length of contact between the die and the work remaining unchanged during the operation and with the radius of curvature of the contact line between the die and work decreasing as the diameter of the tube decreases in passing through the die and with the area of the groove forming ridge in the die varying as the diameter of the die varies so that the drawing action is confined to that portion of the tube which is being channeled.

6. The method of forming a tapered tube having a periphery which is defined by arcuate portions with a channel between the arcuate portions which includes advancing a tapered unchannelled tube through a rotary contractable member comprising a plurality of parts and with the parts including a die opening, each of said parts having a groove therein, the die within the groove having a ridge projecting into the groove, and contracting said die opening in accordance with the movement of the tube therethrough, said ridge being of a size and shape to produce a channel in the tube by drawing action, the total circumferential length of contact between the die and the work remaining unchanged and with the radius of curvature of the contact line between the die and work decreasing as the diameter of the tube decreases in passing through the die and with the area of the groove forming ridge in the die varying as the diameter of the die varies so that the drawing action is confined to that portion of the tube which is being channelled.

7. The method of forming a tapered tube having a periphery which is defined by circular portions with a channel between the circular portions which includes advancing a tapered unchannelled tube through a rotary contractable die opening having a groove therein, the die within the groove having a ridge projecting into the groove, and contracting said die opening in accordance as the tube passes therethrough, said ridge being of a size and shape to produce a channel in the tube by drawing action, the total circumferential length of contact between the die and the work remaining unchanged and with the radius of curvature of the contact line between the die and work decreasing as the diameter of the tube decreases in passing through the die and with the area of the groove forming ridge in the die varying as the diameter of the die varies so that the drawing action is confined to that portion of the tube which is being channelled, with the speed of travel of the die surface engaging the tube being substantially less than the velocity of the tube.

GEORGE E. BARNHART.